United States Patent [19]

Mizuno et al.

[11] Patent Number: 5,013,823
[45] Date of Patent: May 7, 1991

[54] POLY(ARYLENE SULFIDE) SHEET AND PRODUCTION PROCESS THEREOF

[75] Inventors: Toshiya Mizuno; Yoshikichi Teramoto, both of Tsuchiura; Juichi Wakabayashi, Ibaraki; Takeshi Saito, Tsuchiura, all of Japan

[73] Assignee: Kureha Kagaku Kogyo K.K., Japan

[21] Appl. No.: 442,109

[22] Filed: Nov. 28, 1989

[30] Foreign Application Priority Data

Dec. 2, 1988 [JP] Japan .............................. 63-304167
Feb. 22, 1989 [JP] Japan .............................. 1-40289

[51] Int. Cl.$^5$ .................... C08G 75/00; C08G 75/32
[52] U.S. Cl. .................................. 528/388; 524/609
[58] Field of Search ................................ 528/388

[56] References Cited

U.S. PATENT DOCUMENTS 4,645,826  1/1986  Iizuka et al. .
4,769,190  9/1988  Utsumi et al. .

FOREIGN PATENT DOCUMENTS 57-121052   7/1982  Japan .
59-42611   10/1984  Japan .
59-184619  10/1984  Japan .
61-7332     1/1986  Japan .
62-251121  10/1987  Japan .
63-92430    4/1988  Japan .

Primary Examiner—Morton Foelak
Attorney, Agent, or Firm—Lowe, Price, LeBlanc, Becker & Shur

[57] ABSTRACT

A poly(arylene sulfide) sheet excellent in planarity and smoothness is formed of a poly(arylene sulfide) having a melt viscosity, $\eta^*$ of 1,000–25,000 poises as measured at 310° C. and a shear rate of 200 sec$^{-1}$, and a melt crystallization temperature, $T_{c2}$ or 170°–240° C., wherein $T_{c2}$ is an exothermic peak temperature of crystallization which appears upon the measurement by a differential scanning calorimeter at a cooling rate of 10° C./min after the polymer is heated from 23° C. to 380° C. at a rate of 10° C./min and then held for 3 minutes at 380° C. It has a surface roughness, Ra of 0.09 μm or less on at least one side thereof and a degree of crystallization of at least 5%. Its number of flexings to break, Y satisfies the following equation (I):

$$\log Y \geq 7.11 - 2.34 \log t \tag{I}$$

wherein t means a thickness (μm) of the sheet. The sheet is produced by melt-extruding the poly(arylene sulfide) through a slit die into a sheet-like form and then cooling and crystallizing the sheet on a casting roll. The temperature, T (°C.) of the casting roll is controlled to a temperature in a range satisfying the following equation (II):

$$120 \leq T \leq 190 - 0.02t \tag{II}$$

wherein t means a thickness (μm) of the sheet, thereby conducting the cooling and the crystallization of the sheet at one stage.

4 Claims, 4 Drawing Sheets

POLY(ARYLENE SULFIDE) SHEET AND PRODUCTION PROCESS THEREOF

FIELD OF THE INVENTION

This invention relates to a sheet of a poly-(arylene sulfide) which may hereinafter be called "PAS", and more specifically to a PAS sheet composed of a PAS and having excellent dimensional stability to heat, planarity, smoothness and mechanical properties such as flex resistance and to a production process thereof.

BACKGROUND OF THE INVENTION

Films composed principally of a PAS typified by poly(phenylene sulfide) which may hereinafter be called "PPS" have excellent properties such as high heat resistance, chemical resistance and mechanical strength, and good electrical properties and are useful for various industrial applications.

Stretched PAS films however involve a problem that they tend to undergo deformations such as heat shrinkage in a high temperature range. Unstretched PAS sheets of smaller orientation are hence used for applications where high-temperature dimensional stability is required. In this case, since PAS has a lower glass transition temperature, its crystallization is indispensable in order to impart heat resistance to the sheets. The reason is that among conventional unstretched PAS sheets, uncrystallized ones show significantly lowered strength when the temperature increases to 100° C. or so and they hence undergo great deformation under a slight load. As illustrated in FIG. 1 by way of example, when the unstretched sheets are heated up at a constant rate under a slight fixed load, an uncrystallized sheet shows a high elongation from about 120° C. as depicted by a line (3), indicating that it is deformed to a great extent by the slight load. On the other hand, a sheet having a degree of crystallization of 6% does not exhibit such a great deformation at about 120° C. as the uncrystallized sheet has shown as depicted by a line (1). Further, it is found that a sheet crystallized to a degree of crystallization sufficiently as high as 24% shows a little deformation at high temperatures as depicted by a line (2) and its high-temperature dimensional stability is hence good. Unstretched PAS sheets sufficiently crystallized by conventional crystallization processes are however accompanied by disadvantages that they have a low elongation and are liable to be brittle.

With respect to the improvements of unstretched PPS sheets, various proposals have been made in, for example, Japanese Patent Publication No. 42611/1984, and Japanese Patent Application Laid-Open Nos. 121052/1982, 184619/1984 and 251121/1987 to date.

Conventionally, crystallization of an unstretched PAS film has been effected by subjecting an amorphous sheet to a heat treatment in a temperature range of from the glass transition point of PAS or higher to its melting points or lower. Namely, a sheet-like formed product composed principally of PPS has generally been produced by melting the starting resin, extruding the melt through a slit die, cooling and solidifying the extrudate into an amorphous sheet, and then subjecting the sheet to a heat treatment.

The conventional heat treatments for crystallization include, for example, a method in which a sheet to be treated is brought into contact with a heated liquid or gas stream or a surface of a heated solid such as a roll (Japanese patent publication No. 42611/1984). It has also been known to smoothen the surface of a sheet-like material by subjecting the sheet-like material to a heat treatment while supporting it with clamps or the like at its periphery or causing it to continuously pass through a hot-air oven in a state supported at one or two points continuously or heat treating it on a smooth stainless steel belt, followed by compression forming or pressing between pressure rolls (Japanese patent Application Laid-Open No. 184619/1984).

These conventional heat treatment methods are however difficult to provide sheets excellent in both planarity and smoothness when unstretched pAB sheets are industrially produced. Moreover, the provision of a smooth PAS sheet requires a complex step such as compression forming or rolling, so that larger production facilities are required.

Incidentally, the behavior of a PAS sheet upon its heat treatment includes that a sheet cooled and solidified in an amorphous state is exposed to a temperature above the glass transition point owing to its heating and upon a lapse of a predetermined time, is crystallized and hardened. When a PAS sheet is subjected to a heat treatment in a heated liquid or gas stream by way of example, the sheet expands and becomes sticky as the temperature increases. When the temperature increases beyond the glass transition point of the PAS and the sheet becomes soft, the sheet is distorted or locally elongated, sticks to another material or object which is in contact with the sheet, or forms a roughened surface due to eruption of low boiling materials contained inside the PAS. Crystallization thereafter proceeds, and the sheet shrinks volumetrically by its density increment accompanied by the crystallization and hence undergoes changes in dimension corresponding to the volumetric shrinkage, thereby hardening the sheet. The resultant sheet is however poor in planarity and its surface conditions are inferior.

In addition, in the crystallization owing to heated air, a PAS becomes very soft at its glass transition point or higher and a PAS sheet deforms and/or breaks due to a slight wind pressure. Indeed, it is hence extremely difficult to obtain a sheet excellent in smoothness. Further, the growth of spherulites is also remarkable. It is hence only possible to obtain a sheet inferior also in planarity.

As described above, the PAS sheet expands with heat and becomes soft in the course of the heat treatment. Therefore, unless the sheet is mechanically fixed during the heat treatment, the planarity of the sheet is reduced and thickness irregularity occurs, thereby deteriorating its appearance.

In the heat treatment method in which a PAS sheet is simply brought into contact with a surface of a solid such as a heating roll or stainless steel belt, the sheet expands and moreover becomes sticky as the temperature increases and at the same time, volumetric shrinkage caused by crystallization occurs. Accordingly, the sheet may locally and slightly float from the surface of the solid. In addition, entrainment of air is also observed. Subsequent crystallization results in hardening of the sheet. In this case, height differences arise in the surface of the sheet between areas maintained in contact with the solid and those floated from the solid. It is hence only possible to obtain a sheet inferior in planarity.

When a PAS sheet is subjected to a heat treatment by means of a tenter while holding it with clips or the like, the clipped parts become useless and moreover, the resultant sheet is susceptible to breakage from the clipped parts. Besides, the tenter involves an economical problem because its equipment cost and operating cost are expensive.

Even if such a crystallized PAS sheet of poor planarity is pressed by compression forming or rolling, it is impossible to fully remove the thickness irregularity, warpage, small ruggedness and the like to make the sheet excellent in planarity and smoothness because it has already been crystallized. Moreover, the process is complex and there is hence a disadvantage also from economical consideration.

The present inventors previously found that a PAS sheet excellent in planarity and smoothness can be obtained by upon heat treatment of an amorphous PAS sheet through a heating roll, preheating the sheet and then causing the thus-preheated sheet to pass between the heating roll and a pinch roll under a pinch pressure of 0.05-10 kg/cm, whereby the sheet is continuously pressed under linear pressure, and applied for a patent (Japanese Patent Application No. 329542/1987). As has been described therein, when the PAS sheet is crystallized on the heating roll while controlling temperature and contact pressure by making use of the pinch roll, its planarity can be improved to a great extent compared to conventional sheets, there are however potential problems that the ruggedness on surface of the pinch roll is transferred on the surface of the sheet and/or coarse spherulites generate. Therefore, this process is still insufficient to use in fields where high planarity and smoothness are required. In addition, a separate step for conducting the heat treatment is required in this process.

It has been proposed to in the production of a crystallized polyether ether ketone film, conduct cooling and crystallization of a film at one stage by controlling the temperature of a casting roll to a temperature in a range of 150°-250° C. (Japanese Patent Application Laid-Open No. 92430/1988). When this process is applied to the production process of a sheet making use of a conventional PAS low in melt crystallization temperature, $T_{c2}$, crystallization of the sheet on the casting roll is insufficient, and moreover since the PAS is characterized by high susceptibility to elongation when it is in the amorphous state at a temperature not lower than its glass transition point, the sheet adheres closely to the roll and hence becomes poor in separation property from the roll. It is hence only possible to obtain a sheet inferior in planarity, smoothness and physical properties.

Moreover, when the PAS is used, there is a potential case where a resulting sheet may have low flexing properties even if the sheet is good in appearance. It is hence necessary to select suitably the temperature and time ranges of the process.

OBJECT AND SUMMARY OF THE INVENTION

An object of this invention is to provide a PAS sheet excellent in dimensional stability to heat, planarity, smoothness, flex resistance, etc.

Another object of this invention is to provide a PAS sheet excellent in physical properties, particularly, planarity of the sheet surfaces by an economical process.

A further object of this invention is to provide a PAS sheet having excellent dimensional stability to heat, planarity, smoothness, flex resistance, etc. and containing solvent-extracted low-molecular weight materials such as oligomers in smaller amounts.

The present inventors have carried out an extensive investigation with a view toward solving the above-mentioned drawbacks of the prior art. As a result, it has been found that a PAS sheet excellent in planarity, high in smoothness on at least one side of the sheet and superb in mechanical properties such as flex resistance can be economically obtained by melt-extruding a high molecular weight PAS having a high melt crystallization temperature range through a slit die into a sheet-like form and then cooling and crystallizing the sheet at one stage on a casting roll controlled within a specific temperature range.

In addition, it has also been found that when a PAS having a high molecular weight and a high melt crystallization temperature range and treated in advance by melt-extruding by a vented extruder while drawing a vacuum from a vent zone through a vent port is used as the above PAS, a PAS sheet in which materials extracted by extraction with xylene is reduced to 0.5 wt. % or less of the whole weight before extraction and which hence contains solvent-extracted low-molecular weight materials such as oligomers in smaller amounts can be obtained. The PAS sheet containing solvent-extracted low-molecular weight materials in smaller amounts is suitable for use as a sheet for insulating the motors of coolant-compressors.

These findings leads to completion of the present invention.

In an aspect of this invention, there is thus provided a poly(arylene sulfide) sheet excellent in planarity and smoothness. The sheet is formed of a poly(arylene sulfide) having a melt viscosity, $\eta^*$ of 1,000-25,000 poises as measured at 310° C. and a shear rate of 200 sec$^{-1}$, and a melt crystallization temperature, $T_{c2}$ of 170°-240° C., wherein $T_{c2}$ is an exothermic peak temperature of crystallization which appears upon the measurement by a differential scanning calorimeter at a cooling rate of 10° C./min after the PAS is heated from 23° C. to 380° C. at a rate of 10° C./min and then held for 3 minutes at 380° C. The sheet features that:

(a) the surface roughness, Ra of at least one side of the sheet is 0.09 μm or less;

(b) the degree of crystallization of the sheet is at least 5%; and (c) the number of flexings to break, Y of the sheet satisfies the following equation (I):

$$\log Y \geq 7.11 - 2.34 \log t \qquad (I)$$

wherein t means a thickness (μm) of the sheet.

In another aspect of this invention, there is also provided a process for the production of a poly(arylene sulfide) sheet excellent in planarity and smoothness. The process comprises melt-extruding a poly(arylene sulfide) through a slit die into a sheet like form and then cooling and crystallizing the sheet on a casting roll. The process is characterized in that the above-described poly(arylene sulfide) is used as a poly(arylene sulfide), the temperature, T (° C.) of the casting roll is controlled to a temperature in a range satisfying the following equation (II):

$$120 \leq T \leq 190 - 0.02t \qquad (II)$$

wherein t means a thickness (μm) of the sheet, thereby conducting the cooling and the crystallization of the sheet at one stage.

Compared with the crystallized PAS sheets obtained in accordance with the conventional processes by subjecting a quenched and solidified amorphous sheet to a heat treatment, the PAS sheets according to this invention are excellent in planarity, extremely smooth on at least on side of the sheet surfaces and also superb in mechanical properties such as flex resistance.

Moreover, according to this invention, it is possible to provide a PAS sheet having an excellent planarity, smoothness and flex resistance and containing materials extracted by extraction with xylene in an amount of 0.5 wt. % or less of the whole weight before extraction by using, as the PAS, a PAS obtained by melt-extruding by a vented extruder in advance while drawing a vacuum from a vent zone through a vent port.

DETAILED DESCRIPTION OF THE INVENTION

PAS

Figure 1:
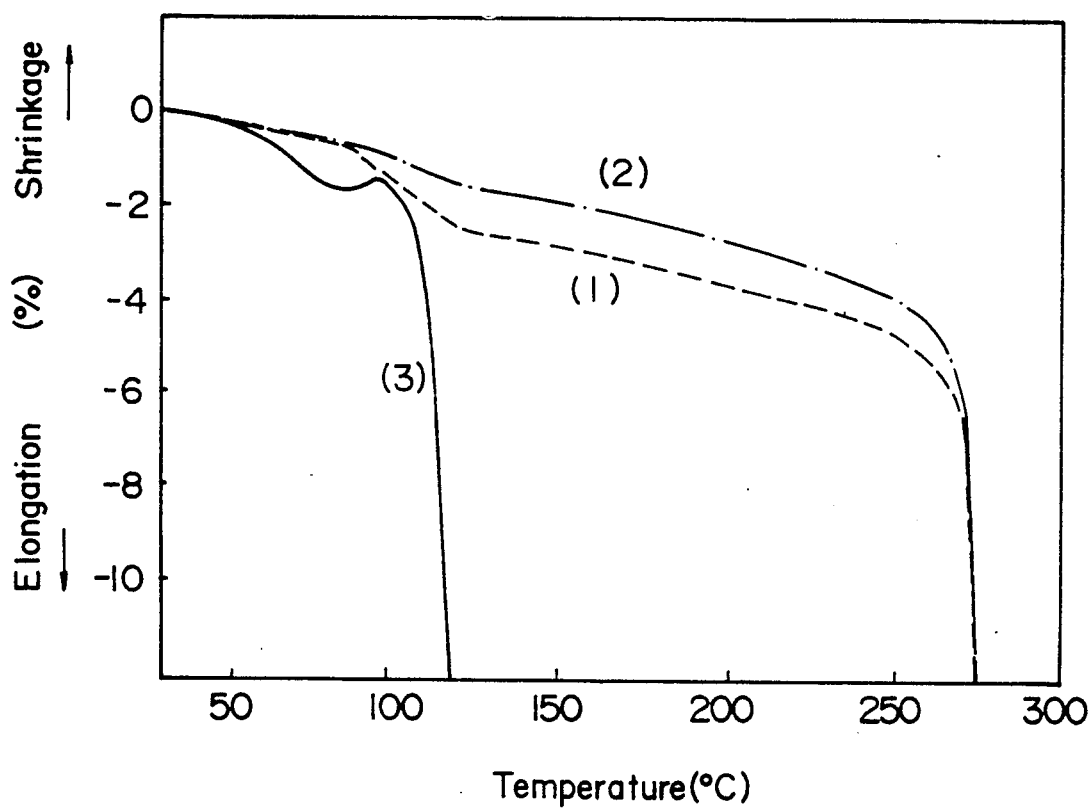
FIG. 1 diagrammatically shows the elongation or shrinkage behavior depending on heating temperatures of each sheet obtained in Example 14, and is a graph obtained by measuring the sheet by a "Thermo Mechanical Analyzer (TMA) 40" manufactured by Mettler Instrument AG while heating it at a heating rate of 2° C./min under a minimum load of 1.7 g/mm$^2$, wherein lines (1), (2) and (3) correspond to Sheet A (degree of crystallization: 6%), Sheet B (degree of crystallization: 24%) and Sheet C (degree of crystallization: 0%) in Example 14, respectively.

In this invention, PAS is used as a raw material of a sheet. The term "PAS" as used herein means PAS alone and resin compositions comprising, as a principal component, PAS and incorporated with one or more other thermoplastic resins, fillers, antioxidants, nucleating agents and/or other additives therein. (PAS)

In order to permit formation into a sheet, the PAS useful in the practice of this invention should be a substantially linear, high-molecular weight PAS whose melt viscosity, $\eta^*$ is 1,000–25,000 poises, preferably, 3,000–20,000 poises as measured at 310° C. and a shear rate of 200 sec$^{-1}$.

The term "substantially linear, high-molecular weight PAS" as used herein means a polymer obtained from a monomer composed principally of a substantially bifunctional monomer. Incidentally, the PAS may be a polymer in which a partially branched structure has been introduced, for example, by causing a small amount of a polyhalogenated benzene to exist as a monomer.

If the melt viscosity of the PAS is lower than 1,000 poises, the PAS is inferior in film-forming property and is unable to provide a sheet stably, and moreover a resulting sheet becomes low in flexing property. On the contrary, any melt viscosities exceeding 25,000 poises make it difficult to melt-extrude the PAS stably.

The PAS employed in this invention should be a PAS whose melt crystallization temperature, $Tc_2$ is 170°–240° C., preferably, 180°–240° C., more preferably, 200°–240° C., wherein $Tc_2$ is an exothermic peak temperature of crystallization which appears upon the determination by a differential scanning calorimeter (hereinafter abbreviated as "DSC") at a cooling rate of 10° C./min after the PAS is heated from 23° C. to 380° C. at a rate of 10° C./min and then held for 3 minutes at 380° C.

If $Tc_2$ is lower than 170° C., the crystallizing rate on a casting roll of the sheet melt-extruded becomes slow and its crystallization hence requires a lot of time, so that the PAS is unsuitable for practical use. In addition, since the crystallization on the casting roll is insufficient, the sheet closely adheres to the surface of the roll and hence is hard to come away from the roll. Therefore, trouble such as local elongation of the sheet arises. It is hence only possible to obtain a sheet inferior in planarity, smoothness and appearance and poor in mechanical properties. If $Tc_2$ is higher than 240° C. on the contrary, the crystallization speed of the PAS sheet is too fast, so that it is difficult to obtain a sheet having sufficient flexing resistance. This is believed to be attributed to the fact that the crystalline structure in the thickness-wise direction of the PAS sheet becomes uneven.

Such a substantially linear, high-molecular weight PAS can be obtained suitably by subjecting an alkali metal sulfide and a dihalogenated aromatic compound to specific two-stage heat-up polymerization in the presence of water in an organic amide solvent such as N-methylpyrrolidone as disclosed in Japanese Patent Application Laid-Open No. 7332/1986.

Illustrative examples of the alkali metal sulfide may include lithium sulfide, sodium sulfide, potassium sulfide, rubidium sulfide, cesium sulfide, and mixtures thereof.

As exemplary dihalogenated aromatic compounds, may be mentioned p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl,3,5-dichlorobenzoic acid, p,p'-dichlorodiphenyl sulfone, 4,4'-dichlorodiphenyl sulfoxide, 4,4'-dichlorodiphenyl ketone, and mixtures thereof.

PAS useful in the practice of this invention are substantially linear. Of these, poly(phenylene sulfide), particularly, poly(p-phenylene sulfide) or poly(p-phenylene sulfide) copolymers containing m-phenylene sulfide units as a minor component are preferred. In addition, poly(p-phenylene sulfide) copolymers in which a partially branched structure is introduced by copolymerizing a polyhalogenated benzene as a minor component may be used suitably.

Optional components

Although a PAS alone may be used in this invention, it is also feasible to add a small amount of a polyolefin such as polyethylene, polypropylene or poly-4-methyl-pentene-1, a rubber such as polyisoprene, or a thermoplastic resin such as polyethylene terephthalate, polycarbonate, tetrafluorinated ethylene resin, polyether ether ketone, poly(ketone sulfide), polyamide, aromatic polyimide, aromatic polyester, polystyrene, polyacrylic acid ester, polymethacrylic acid ester, polyether nitrile, polyether ketone, polyether ketone ketone, polysulfone or polyetherimide.

It is also feasible to incorporate one or more of various organic and inorganic fillers such as glass fibers, aromatic polyamide fibers, carbon black, talc, clay, titanium oxide, molybdenum disulfide and carbon fibers.

Besides, additives such as antioxidant, heat stabilizer and lubricant may also be incorporated.

Among various additives, carbon black, silicon oxide, kaolin, clay, titanium oxide or the like is preferably added as a nucleating agent in particular. Such addition restrains the growth of spherulites in a crystallized sheet and hence makes surfaces of the sheet more smooth. When a melt-extruded sheet is pinned on a casting roll while applying static electricity, coarse spherulites tend to form on the pinned surface. However, the addition of the nucleating agent effectively restrains such formation.

Besides, the addition of a laminal or fibrous inorganic filler such as mica or carbon fibers is effective in the improvement of the stiffness of the sheet.

These optional components may be mixed by a conventional mixing method, or may be mixed in a molten state and pelletized and thereafter fed to a melt extruder.

Production Process of PAS Sheet

Upon formation of a PAS sheet, a PAS is generally fed to a melt extruder and then heated to a temperature of the melting point of the PAS or higher, so that the polymer is melted. The thus-melted PAS is continuously extruded in the form of a sheet through a slit die such as a T-die, followed by its cooling and solidfying on a casting roll.

In this invention, the temperature, T of this casting roll is controlled to give a temperature in a range of 120°-190° C., depending on the thickness of the resultant sheet, namely, a temperature in a range satisfying the following equation (II):

$$120 \leq T \leq 190 - 0.02t \quad (II)$$

wherein t means a thickness ($\mu$m) of the sheet, to cool and crystallize the sheet at one stage.

The sheet is more difficult to cool on the casting roll as it is thicker. It is hence necessary to control the temperature of the casting roll corresponding to the thickness of the sheet.

If the temperature of the casting roll is lower than the lower limit (120° C.) of the above equation, the sheet is substantially quenched to form an amorphous sheet. It is hence only possible to obtain a sheet inferior in mechanical properties. It is therefore difficult to provide a sheet having a degree of crystallization of at least 5%. In addition, under such low-temperature conditions, crystallization does not very proceed even when the residence time of the sheet on the casting roll is elongated. Further, the low-crystallized sheet is poor in separation property from the casting roll. It is hence difficult to obtain a sheet having good planarity.

However, the separation property at low temperature itself is relatively improved if a ceramic is used as a material for the casting roll surface or a fluorine-containing release agent or the like is applied on the casting roll. However, since the PAS sheet is characterized by high susceptibility to elongation when it is in the amorphous state at a temperature not lower than the glass transition point, Tg of the PAS but not higher than the lower limit of the above temperature range because no crystallization of the PAS sheet substantially proceeds, it is impossible to obtain smooth separation property.

On the contrary, any temperatures of the casting roll exceeding the upper limit (about 190° C.) of the above equation (II) will result in a sheet deteriorated in flex resistance. This is believed to be attributed to the fact that the temperature of the PAS, which leads to the maximum crystallization rate, is about 190° C. and the crystallization in a region beyond this temperature results in formation of large spherulites. In addition, it is assumed that crystal lamellae forming the spherulites also become thicker and their crystal size becomes larger as the temperature is higher, so that the tie chains linking the crystal lamellae together also become a little. It is therefore considered that the flex resistance is deteriorated because the bonding force between crystal lamellae, and the interspherulite bonding force become weak as has been described above. A preferred upper-limit temperature viewed from the point of flex resistance is about 175° C., although it varies depending on the thickness of the sheet.

Viewed from the point of film-forming stability, it is possible to form a film up to a temperature at which crystallization becomes free from occurrence on the casting roll, i.e., about 240° C., although the crystallization speed becomes slow when the temperature of the casting roll is higher than 190° C. However, the sheet formed in such a high-temperature region cannot be a sheet good in flex resistance from the reasons as described above.

The residence time of the melt-extruded sheet on the casting roll is generally 0.1-5 minutes, although it varies depending on the temperature of the casting roll and the range of the melt crystallization temperature, $T_{c2}$.

In order to cause the melt-extruded PAS sheet to closely adhere on the casting roll, it is preferred to use a static-electricity applying process. When using the static-electricity applying process in combination, it is possible to make a sheet more smooth.

When the crystallized PAS sheet obtained in the manner described above is subjected to an additional heat treatment at an elevated temperature of 200°-280° C. for 0.1-180 minutes, a sheet having not only excellent planarity and smoothness but also a still higher modulus of elasticity can be obtained. The thus-obtained sheet is excellent in dimensional stability. Below the lower limit of this temperature range, the degree of crystallization may remain somewhat low and the modulus of elasticity may not be increase substantially. In contrast, above the upper limit of this temperature range, the fusion of the PAS takes place and the planarity and smoothness are deteriorated. Further, if the heating time is shorter than the lower limit of the above range, effects of the heat treatment cannot be brought about fully. On the other hand, any unduly long heating time is not economical from the process consideration.

Production process of low-degree of crystallization sheet

A PAS sheet having a degree of crystallization controlled as low as about 5-15% is superior in bending processability to conventional crystallized sheets. Therefore, even when the PAS sheet is subjected to a forming and processing by bending at room temperature (forming at a temperature of about 23° C. without heating), whitening and breaks at bent portions do not take place.

In the case of a low-degree of crystallization sheet as thick as 150 μm or more in particular, this phenomenon is remarkable compared to high-degree of crystallization sheets having the same thickness.

Upon the production of such a low-degree of crystallization PAS sheet, the range of its producing conditions is significantly limited. Its production depends on the crystallization speed of PAS's own, i.e., its melt crystallization temperature, $Tc_2$ and moreover on the temperature of a casting roll and the residence time of the PAS on the casting roll. In the case where sheets are formed industrially, it is important to control the temperature of a casting roll and the residence time thereon in particular.

This respect will be described by examples.

Figure 2:
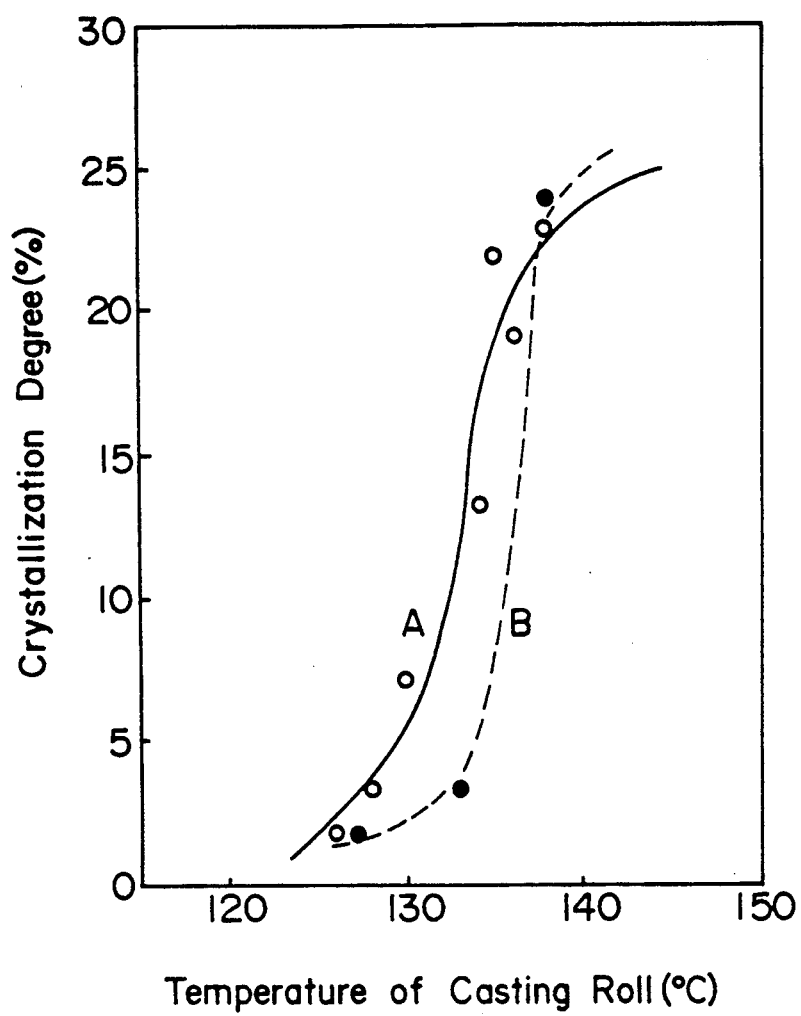
FIG. 2 diagrammatically shows a relationship between the temperature of a casting roll and the degree of crystallization of a poly(p-phenylene sulfide) sheet upon the production of sheets of 200 μm thick, wherein A and B indicate a case where the residence time on the casting roll is 90 seconds and a case where the residence time on the casting roll is 50 seconds, respectively.

FIG. 2 diagrammatically shows a relationship between the temperature of a casting roll and the degree of crystallization when poly(p-phenylene sulfide) has been crystallized from a molten state on the casting roll to give a sheet thickness of 200 μm, wherein A and B indicate a case where the residence time on the casting roll is 90 seconds and a case where the residence time is 50 seconds, respectively. In the case of A in FIG. 2, when the temperature of the casting roll is 128°C., its degree of crystallization is 3.4%, while the degree of crystallization increases to 22% when the temperature of the casting roll rises to 135° C. by 7° C. Therefore, in order to control the degree of crystallization to a range of 5-15% in this case, the temperature of the casting roll must be controlled within a range of 4° C. as 130°-134° C. This means that the temperature of the casting roll must be controlled very carefully in the case where sheets ar produced industrially.

Further, B in FIG. 2 indicates a case where the residence time has been made short as 50 seconds. The shorter residence time indicates a tendency to further limit the temperature range of the casting roll when controlling the sheet to a low degree of crystallization.

Figure 3:
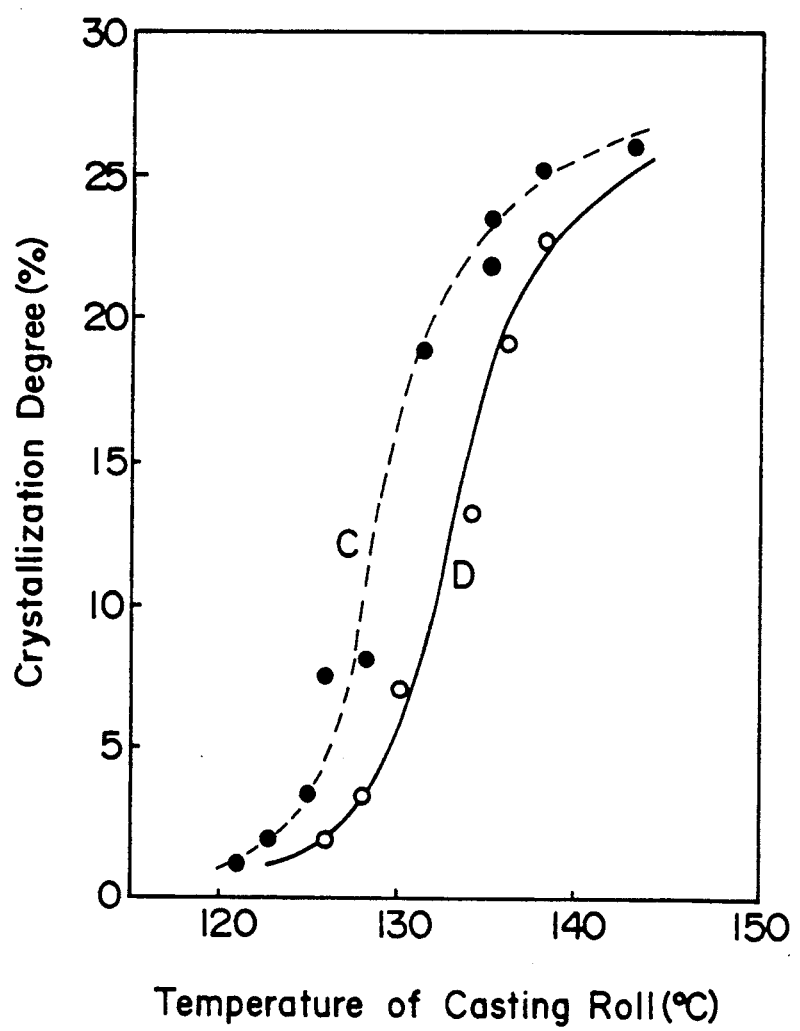
FIG. 3 diagrammatically shows a relationship between the temperature of a casting roll and the degree of crystallization of a poly(p-phenylene sulfide) sheet upon the production of sheets by controlling the residence time to 90 seconds, wherein C and D indicate a sheet of 400 μm thick and a sheet of 200 μm thick, respectively.
Figure 4:
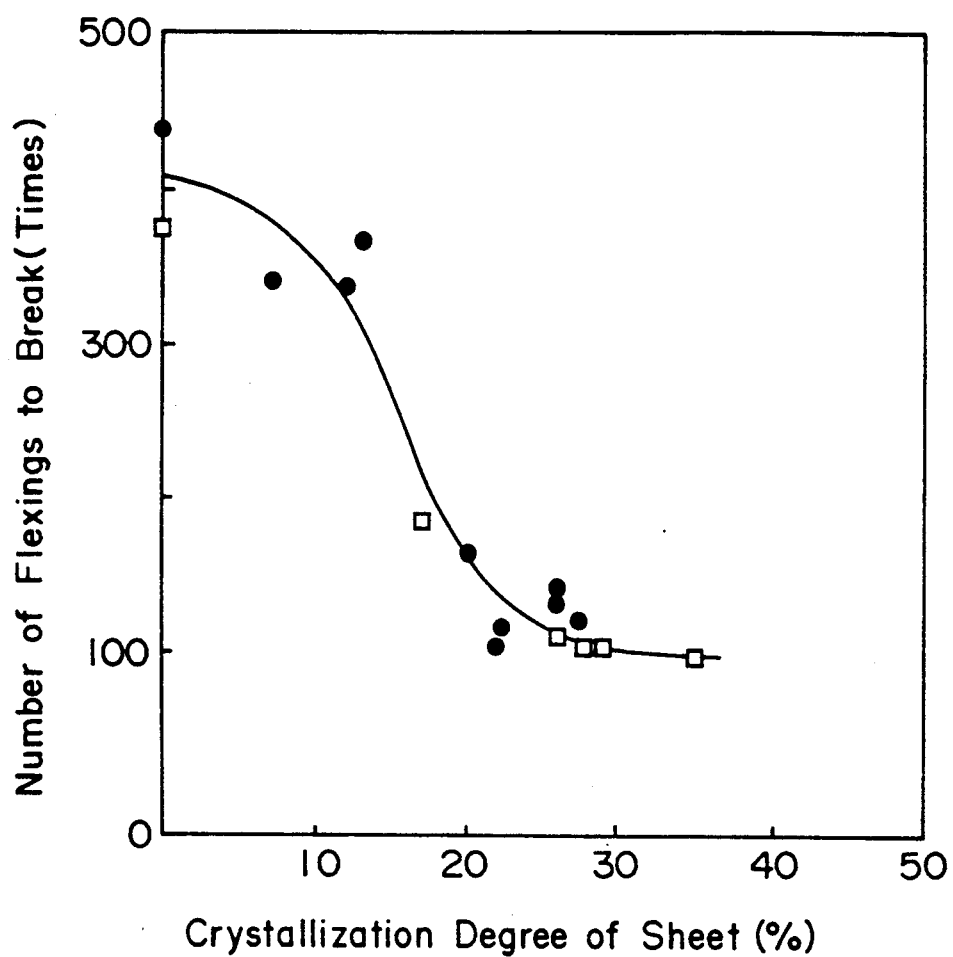
FIG. 4 diagrammatically shows a relationship between the degree of crystallization and the flex resistance (in terms of the number of flexings to break) for poly(p-phenylene sulfide) sheets having a specific thickness, wherein ● and □ indicate sheets of 200 μm thick, which have been produced by using poly(p-phenylene sulfides) having melt viscosities, $\eta^*$ of 6,000 poises and 2,600 poises, respectively.

Similarly, FIG. 3 diagrammatically shows a relationship between the temperature of a casting roll and the degree of crystallization when poly(p-phenylene sulfide) has been crystallized from a molten state on the casting roll. D on the graph indicates a case where the thickness of the sheet is 200 μm, while C designates a case where the thickness of the sheet is 400 μm. The residence time on the casting roll is 90 seconds in each case. The difference in heat quantity for cooling from the molten state becomes greater per area of a sheet as the sheet is thicker. It is hence necessary to lower the temperature of the casting roll relatively. The controlling range of the temperature tends to narrow though it is a little.

In order to produce such a low-degree of crystallization PAS sheet, it is preferred to form a sheet by using a PAS having a melt crystallization temperature, $Tc_2$ of 170°-220° C., and controlling the temperature of the casting roll and the residence time on the casting roll respectively to 120°-160° C. and a range of 5-300 seconds.

Production conditions of oriented crystallized sheet

Besides, it is possible to provide an oriented sheet by using a high-viscosity PAS having a melt viscosity as high as at least 5,000 poises, preferably 7,000 poises, controlling the delivery rate from a T-die and the take-up rate of a sheet and taking up at a relatively large drawdown ratio (draft ratio) upon melt extrusion and casting. It is also possible to render the sheet 0.7 or lower in terms of the below-described degree of orientation. This sheet can be thined with ease compared to a case where a low-viscosity PAS is used. The oriented crystallized sheet thus obtained has further improved flex resistance and mechanical properties such as yield strength and breaking strength.

A great feature of the sheet obtained by orienting and crystallizing on the casting roll is that it is good in dimensional stability in spite of the oriented sheet. Such behavior is believed to be attributed to the fact that the stretched degree of amorphous chains is low, and the crystalline size is relatively even and fine particulate crystals liable to melt are little. Such a structure is manifested by crystallizing a melt at an elevated temperature under molecular orientation. This process is preferred from the process economy because it does not require any high temperatures compared to such conventional processes as a sheet is stretched near at its glass transition point and the thus-stretched sheet is subjected to a heat treatment while maintaining its length constant to crystallize it. In addition, in the case of a relatively low orientation, its dimensional stability is further improved and its strength and elongation in the drafting direction are also great.

In order to obtain such an oriented crystallized sheet, it is necessary to melt-extrude a PAS and then stretch the resulting sheet at a predetermined draft ratio or higher, thereby flow-orienting the sheet and at the same time cooling and crystallizing it. Specifically, it is necessary to use a high-viscosity PAS having a melt viscosity not lower than a certain value, preferably, at least 7,000 poises as measured at 310° C. and a share rate of 200 $sec^{-1}$. In the conventionally-known low viscosity PAS, if a sheet thereof is flow-oriented, its relaxation rate is great and relaxation of orientation occurs. It is hence difficult to crystallize it in an oriented state. More preferably, a PAS having such a high melt viscosity is a resin in which a partially branched structure has been introduced by using, as a monomer, a trihaloganated benzene in an amount of at least 0.05 mol % but at most 5 mol % in addition to a dihalogenated benzene to increase its melt viscosity. Although the melt viscosity is preferably higher, any melt viscosities exceeding 25,000 poises are accompanied by difficulties in melt extrusion.

When extruding the high-viscosity PAS as described above through a T-die into a sheet-like form, the temperature of the resin is preferably in a range of 290°-360° C. Although a lower temperature is preferred as a temperature of the resin in order to restrain the relaxation of orientation to efficiently orient and crystallize the sheet, such a temperature makes it difficult for the resin to flow in the extruder and die. The resin extruded through the T-die is taken off by a casting roll. The take-off rate is made greater than the delivery rate of the resin (this ratio is referred to as "draft ratio"), thereby imparting flow orientation to molecular chains. At this time, it is more preferable that the distance between the tip of the T-die and the casting roll is shorter. Namely, there are effects shortening the time of the process and enlarging the temperature gradient. However, its distance is generally set to about 5–30 mm because of the limitation as to apparatus.

The temperature of the casting roll is preferably at least 120° C. because the sheet requires to be crystallized on the roll. The temperature at which the maximum crystallization speed is imparted to the poly(p-phenylene sulfide) resin is nearly 190° C. The sheet is hence crystallized faster as the temperature of the roll is nearer to 190° C. Therefore, when the temperature of the roll becomes a temperature higher than 190° C., particularly, not lower than 200° C., the crystallization also tends to become slow. Since the molten resin is cooled by the casting roll, the temperature of the resin is higher than that of the roll in an initial stage at which the resin has first come into contact with the roll. In addition, a sheet crystallized at an elevated temperature tends to be relatively inferior in flex resistance to the sheet crystallized on a low-temperature casting roll, probably, in the cause of the formation of coarse spherulites. Such a sheet is hence not preferred. Therefore, the temperature of the casting roll is preferably in a range of 120°–190° C. in general. Incidentally, it is preferable that the draft ratio is generally at least 5, more preferably, at least 10 in order to obtain an oriented crystallized sheet, though it greatly depends on the melt viscosity of a resin to be used. The higher the draft ratio, the higher the orientation. However, its upper limit is about 5,000 in order to conduct stable take-up. As a take-up tension, at least 2.5 g/mm$^2$ or more is preferred.

Removing method of solvent-extracted low-molecular weight materials

When attempting to obtain a sheet of a low oligomer content in this invention, it is possible to produce a PAS sheet containing solvent-extracted low-molecular weight materials such as oligomers in smaller amounts by using, as a PAS useful as a raw material for a sheet, a polymer treated in advance by melt extruding a PAS by a vented extruder while drawing a vacuum from a vent zone through a vent port.

As the vented extruder, may be used either single-screw extruder and twin-screw extruder. In order to reduce occurrence of color development of PAS and unmolten resin, and increase in melt viscosity, it is preferred to hard chrome plate on the portions of the vented extruder, which come into contact with a molten resin, for example, the inner wall of a cylinder and the surface of a screw or to coat with a metal alloy such as cobalt-chrome-boron on their surfaces, thereby covering them with materials free of elemental iron as much as possible.

A PAS is generally heated to 310°–390° C. or so in the vented extruder into a liquid state. It is considered that solvent extracted low-molecular weight materials are removed from the molten resin by drawing a vacuum from the extruder by means of a vacuum pump or the like through a vent port so as to reduce the pressure of a vent zone to at least 400 mmHg or lower, preferably 100 mmHg or lower.

Accordingly, when a sheet is produce from a PAS obtained by melt-extruding PAS powder as a raw material by a vented extruder while drawing a vacuum from a vent zone through a vent port in accordance with the above-described process, a PAS sheet in which materials extracted by extraction with xylene is reduced to 0.5 wt. % or less and which hence contains solvent-extracted low-molecular weight materials in smaller amounts can be obtained.

PAS Sheet

The PAS sheet according to this invention is excellent in planarity and smoothness and has the following physical properties (physical properties before and after heat treatment):

(a) the surface roughness, Ra of at least one side of the sheet is 0.09 μm or less;

(b) the degree of crystallization of the sheet is at least 5%; and (c) the number of flexings to break, Y of the sheet satisfies the following equation (I):

$$\log Y \geq 7.11 - 2.34 \log t \qquad (I)$$

wherein t means a thickness (μm) of the sheet.

The PAS sheet according to this invention is a formed product having a thickness of, generally, 5 mm or less, preferably, from 10 μm to 2 mm, more preferably, from 20 μm to 600 μm.

The PAS sheet of this invention is superior in planarity and smoothness to conventionally-known PAS sheets.

Described in regard to planarity, a PAS sheet obtained by a heat treatment method featuring contact of an amorphous sheet to a solid surface such as a heating roll contains different spots corresponding respectively to areas contacted or stuck to the solid and those floated from the solid due to thermal expansion. In contrast, the PAS sheet according to this invention contains no distortion or warpage over the entire surface thereof, and has good planarity and smoothness, because it is obtained by cooling and crystallizing the sheet-like product melt-extruded at one stage on a casting roll immediately without forming an amorphous sheet.

Regarding smoothness, the PAS sheet of this invention has suitable surface roughness and small coefficient of dynamic friction on both surfaces thereof and has excellent utility. In particular, the surface roughness, Ra of the surface brought into contact with the casting roll is 0.09 μm or less, preferably 0.06 μm or less, more preferably 0.02 μm or less. It is hence extremely small compared with those of conventional sheets.

The PAS sheet according to this invention is a crystallized sheet having a degree of crystallization of at least 5%. A PAS sheet having a degree of crystallization lower than 5% is insufficient in heat resistance. Such a sheet becomes extremely soft like a starch syrop in a temperature range exceeding the glass transition point of the PAS and is inferior in heat resistance, and is hence not practical. However, it may be preferred to choose a suitable range of the degrees of crystallization within ranges of the degrees of crystallization not lower than 5% depending on each intended end use because a PAS sheet having a lower degree of crystallization tends to exhibit better flex resistance.

With respect to mechanical properties, the PAS sheet of this invention is excellent in various properties such as, not to speak of flex resistance, yield strength, breaking strength, elongation at break and tensile modulus. The sheet is hence very practical.

From the viewpoint of flex resistance, the PAS sheet of this invention has excellent flex resistance as demonstrated by its number of flexings to break, Y satisfying the following equation (I):

$$\log Y \geq 7.11 - 2.34 \log t \quad (I)$$

wherein t means a thickness ($\mu$m) of the sheet.

In particular, the oriented crystallized PAS sheet obtained by using a high-viscosity PAS and taking off at a high draft ratio can be provided as a thin film with ease and exhibits high flex resistance.

In addition, the PAS sheet according to this invention has good mechanical properties as demonstrated by its yield strength of at least 6 kg/mm$^2$, breaking strength of at least 4 kg/mm$^2$, elongation at break of at least 10% and tensile modulus of at least 280 kg/mm$^2$ at 23° C.

These mechanical properties can be improved further by using a high-viscosity PAS having a melt viscosity of at least 10,000 poises and taking off at a relatively great draft ratio upon casting, thereby forming an oriented crystallized sheet.

Furthermore, when a PAS treated in advance by melt-extruding by a vented extruder while drawing a vacuum from a vent zone through a vent port is used as a raw PAS, a PAS sheet in which materials extracted by extraction with xylene is reduced to 0.5 wt. % or less and which hence contains solvent-extracted low-molecular weight materials in smaller amounts is formed.

Even when the PAS sheet according to this invention is bent for its processing or is set under tension or is subjected to drawing as in vacuum forming or pressure forming, the sheet is sufficiently resistant to breakage.

Application Fields

PAS sheets according to this invention have a surface roughness, Ra of at most 0.09 $\mu$m on its one sides and are hence extremely smooth. Therefore, they can be suitably used, for example, as base films for magnetic recording materials such as base films for floppy disks, in which planarity and smoothness are required, by roughening the other sides to facilitate separation and sliding.

Besides, the PAS sheets of this invention can be used in a wide variety of application fields in which heat resistance, planarity, smoothness, flex resistance and the like are required, for example, in the field of electronic and electrical engineering as capacitor films, flexible printed circuit boards, chip carriers and TAB (tapes for automated bonding) and in some cases, in the field of mechanical engineering as sliding members like bushings which are each formed of an iron plate and a filler-added film bonded to the iron plate.

A PAS sheet in which materials extracted by extraction with xylene is reduced to 0.5 wt. % or less and which hence contains solvent-extracted low-molecular weight materials in smaller amounts is suitably used in applications in which mechanical properties such as flex resistance, heat resistance and Fleon resistance and at the same time, an extremely low oligomer content (low content of solvent-extracted materials) are required, for example, as sheets for insulating the motors of coolant-compressors.

ADVANTAGES OF THE INVENTION

According to the present invention, there is economically provided a PAS sheet comprising a PAS as a raw material and having excellent dimensional stability to heat, planarity, smoothness and mechanical properties such as flex resistance.

According to this invention, there is also provided a PAS sheet having the above-mentioned physical properties and containing solvent-extracted low-molecular weight materials in smaller amounts.

EMBODIMENTS OF THE INVENTION

The present invention will hereinafter be described specifically by the following Examples and Comparative Examples. It should however be borne in mind that this invention is not limited to the following Examples only.

Measurements of physical properties:

The following methods were followed for the measurement of characteristic data of PAS and PAS sheets in this invention.

Melt viscosity

The melt viscosity of each PAS was measured at 310° C. and a shear rate of 200 sec$^{-1}$.

Melt crystallization temperature

The melt crystallization temperature, $T_{c2}$ of each PAS was determined by reading an exothermic peak temperature of crystallization, which appeared upon the measurement by a DSC at a cooling rate of 10° C./min after the PAS is heated from 23° C. to 380° C. at a rate of 10° C./min and then held for 3 minutes at 380° C., from a graph.

Surface roughness

Each surface roughness, Ra ($\mu$m) was measured in accordance with JIS B-0601, using a surface roughness meter ("SURFCOM 550A", trade name; manufactured by Tokyo Seimitsu Co., Ltd.).

Coefficient of dynamic friction

Each coefficient of dynamic friction was measured in accordance with ASTM D 1894, using a "Friction Meter, Model TR" manufactured by Toyo Seiki Seisakusho, Ltd.

Degree of crystallization

A density gradient tube was formed using a zinc chloride-water system. From specific gravity ($\rho$) measured at 23° C., crystalline density ($\rho c$) and amorphous density ($\rho a$), the weight-average degree of crystallization (Xc) was determined in accordance with the following equation:

$$X_c = (\rho c / \rho)\{(\rho - \rho a)/(\rho c - \rho a)\}$$

Incidentally, $\rho c$ of the poly(phenylene sulfide) used in the present Examples was 1.4300 from the data of literature [$\rho c = 1.43$ in European polymer Journal, Vol. 7, 1127(1971)] and $\rho a$ was 1.3125 as a measured average value of samples which were identified as an amorphous form among various samples prepared by quenching.

Breaking strength, elongation at break, tensile modulus and yield strength

Using "TENSILON" (trade name) manufactured by Toyo-Baldwin Company, sample sheets punched out by a No. 5 dumbbell were measured at 23° C. and 200° C. respectively in accordance with ASTM D-638. The sample length, width and stretching rate were set at 33 mm, 6 mm and 50 mm/min respectively. The breaking strength and elongation at break were determined from a strain-stress curve, while the tensile modulus was determined from the initial strain zone. Further, a yield stress is defined as the yield strength.

Degree of orientation

A strip of 1 mm wide was cut out of a sheet, which had been obtained by exactly arranging samples in their take-up direction and laminating them so as to give a thickness of at least 4 mm, in parallel with the take up direction. The strip specimen thus cut out was set on a fibrous specimen carrier attached to a K-ray diffractometer manufactured by Rigaku Denki K.K. in such a manner that X-rays struck on the specimen in parallel with the direction of the width of 1 mm and at a right angle to the thickness-wise direction of the sheet laminated to give the thickness of at least 4 mm (namely, in such a manner that the X-rays struck on the specimen sheet in a direction perpendicular to an edge face thereof).

The specimen was set perpendicularly and 2 scanning was conducted in the equatorial direction to determine a diffraction peak intensity of the (200) plane ($I_{\phi=0}$). The specimen was then inclined by 30° from the perpendicular direction and 2 scanning was similarly conducted to determine a diffraction peak intensity of the (200) plane ($I_{\phi=30}$).

The degree of orientation was determined by $I_{\phi=30}/I_{\phi=0}$.

Incidentally, when a PAS sheet is not oriented, its degree of orientation is a value of 0.7 or greater.

Flex resistance—The number of flexings to break

A strip of 100 mm long and 15 mm wide was cut out of each sample to be measured. Using an MIT flexural fatigue resistance testing machine manufactured by Toyo Seiki Seisakusho, Ltd., the strip sample was set at a chuck interval of 55 mm in accordance with JIS -8115 and was flexed from side to side under a load of 1.25 kg at a flexure angle of 135 degree and a flexure rate of 175 times/min. The number of flexings until the sample sheet was broken was then determined as an index of flex resistance.

Contents of materials extracted with xylene

Square pieces of 1 cm × 1 cm were cut out of each PAS sheet. Ten grams of the pieces were exactly weighed and placed in a flask equipped with a condenser. Further, 100 cc of a commercially-available xylene (special grade) was placed in the flask. The flask was put in an oil bath kept at about 155° C. and solvent-extracted low-molecular weight materials were extracted from the sample pieces while boiling xylene (the boiling point of xylene: about 140° C.). After the extraction was continuously conducted for 72 hours, xylene was cooled to room temperature. A resulting xylene solution was then pour into a weighing bottle. The flask in which the sample pieces remained was washed 3 times with 100 cc in total of xylene. The liquid after the washing was added to the weighing bottle.

The weighing bottle was then heated to about 85° C. and at the same time, xylene was evaporated to a constant weight under slightly reduced pressure, thereby removing xylene. The residue was then weighed to define its weight as the weight of materials extracted with xylene. The weight percentage of the extracted materials by the xylene extraction was found by dividing the weight of the materials extracted with xylene by 100 and multiplying the quotient by 100.

EXAMPLE 1

Substantially linear poly(p-phenylene sulfide) having a melt viscosity of 7,300 poises (as measured at 310° C. and a shear rate of 200 sec$^{-1}$) and a melt crystallization temperature, $Tc_2$ of 172° C. (an exothermic peak temperature of crystallization which appeared upon the measurement by a DSC at a cooling rate of 10° C./min after the pAS is heated from 23° C. to 380° C. at a rate of 10° C./min and then held for 3 minutes at 380° C.) was melt-extruded into pellets.

The pellets thus obtained were extruded into a sheet-like form through a T-die which was fitted to an extruder having a barrel diameter of 35 mm and an L/D ratio of 28 and defined a lip having a clearance of 0.55 mm and a width of 250 mm. The melt temperature of the resin was 310° C., and the delivery rate was 3.0 kg/hour. The distance between the tip of the T-die and the upper portion of a casting roll was adjusted to about 10 mm. The surface temperature of the casting roll was controlled at 155° C. The casting roll had a diameter of 300 mm.

The take-up rate was controlled so that the sheet thus wound had a thickness of 190 μm. The take-up rate was 0.85 m/min.

The thus obtained sheet had a density of 1.341 g/cm$^3$ at 23° C. The degree of crystallization found from this value was 25.9%. The surface roughness, Ra of the sheet were 0.050 μm and 0.130 μm on the side brought into contact with the casting roll and on the opposite side thereto, respectively. The sheet had a coefficient of dynamic friction of 0.3 on the side brought into contact with the casting roll. With respect to flex resistance, its number of flexings to break was measured. It was found to be 320 times.

Further, the sheet was subjected to a heat treatment for 10 minutes at 260° C. by heated air in a Geer oven to facilitate its crystallization. The sheet thus heat-treated had surface roughness, Ra of 0.060 μm and 0.140 μm on the side kept into contact with the casting roll and on the opposite side thereto, respectively. Its degree of crystallization increased to 33.1%. The heat-treated sheet had a coefficient of dynamic friction of 0.3 on the side brought into contact with the casting roll. With respect to flex resistance, its number of flexings to break was measured. It was found to be 110 times. Furthermore, the heat-treated sheet had a yield strength of 9 kg/mm$^2$, breaking strength of 6 kg/mm$^2$, elongation at break of 40% and tensile modulus of 330 kg/mm$^2$.

COMPARATIVE EXAMPLE 1 AND 2

Sheets were separately produced by using the same raw pellets and apparatus as those employed in Example 1 under the same conditions as in Example 1 except that the temperature of the casting roll was changed. The measurement results as to the relationships between the surface temperature of the casting roll and the separation property and degree of crystallization of the thus-obtained sheets are shown in Table 1.

TABLE 1

| | Temperature of casting roll (°C.) | Separation property of sheet | Degree of crystallization of sheet (%) |
|---|---|---|---|
| Comp. | 80 | Good | 0 |

TABLE 1-continued

| | Temperature of casting roll (°C.) | Separation property of sheet | Degree of crystallization of sheet (%) |
|---|---|---|---|
| Ex. 1 Comp. Ex. 2 | 105 | Inferior | <10 |

The sheet of Comparative Example 1 had good surface roughness, Ra of 0.010 μm on both sides, but was substantially amorphous. Its breaking strength was 6 kg/mm² at room temperature, but became extremely weak as about 0.1 kg/mm² at 120° C. Therefore, it deformed under slight external force and was hence in a state difficult to maintain its form. The sheet was subjected to a heat treatment for 10 minutes at 260° C. by heated air in a Geer oven to facilitate its crystallization. Its degree of crystallization was increased to about 33%. However, it was impossible to conduct an even heat treatment over the entire sheet. Therefore, warpage and surface irregularity were too significant to measure its mechanical properties.

The sheet of Comparative Example 2 was inferior in separation property from the casting roll. No smooth sheet was hence obtained. Therefore, local irregularity also resided in its degree of crystallization. All was 10% or lower. In addition, it was infeasible to measure its surface roughness and its mechanical properties after the heat treatment due to the warpage and thickness irregularity of the sheet, which were caused by the inferiority in separation from the casting roll.

EXAMPLE 2: (APPLICATION EXAMPLE OF NUCLEATING AGENT)

Pellets were produced from a system composed of 100 parts by weight of substantially linear poly(p-phenylene sulfide) having a melt viscosity of 6,800 poises (as measured at 310° C. and a shear rate of 200 sec$^{-1}$) and a melt crystallization temperature, $T_{c2}$ of 204° C. and 1.0 parts by weight of carbon black ("Mitsubishi Carbon MA-100", trade name) as a nucleating agent.

Using the pellets thus obtained, a crystallized sheet was produced by the same apparatus as in Example 1 at a melt temperature of 310° C., a delivery rate of 3.0 kg/hour and a casting roll temperature of 160° C. The take-up rate was controlled so that the sheet thus wound had a thickness of 160 μm. The take-up rate was 1.0 m/min.

Upon the take-up of the sheet, it separated from a casting roll with extreme smoothness. The sheet thus obtained had a degree of crystallization of 27.0% and was very smooth as demonstrated by its surface roughness, Ra of 0.010 μm on the side brought into contact with the casting roll. The surface roughness, Ra of the opposite side thereto was 0.040 μm.

The state of formation of spherulites was observed through a scanning electron microscope. Spherulites were not formed but an extremely fine wave-like structure was formed on the surface.

Further, the sheet was subjected to a heat treatment for 10 minutes at 260° C. by heated air in a Geer oven to facilitate its crystallization. The sheet thus heat-treated had surface roughness, Ra of 0.010 μm and 0.040 μm on the side brought into contact with the casting roll and on the opposite side thereto, respectively.

Measurement results of physical properties and others are collectively given in Table 2.

EXAMPLE 3

Using the same poly(p-phenylene sulfide) as that used in Example 2 except for the omission of the nucleating agent, a sheet of 160 μm thick was obtained under the same conditions as in Example 2.

Upon the take-up of &he sheet, it separated from a casting roll with extreme smoothness. The sheet thus obtained had a degree of crystallization of 26.1% and surface roughness, Ra of 0.040 μm and 0.110 μm on the side brought into contact with the casting roll and on the opposite side thereto, respectively.

Measurement results of physical properties and others are collectively given in Table 2.

EXAMPLE 4: (APPLICATION EXAMPLE OF STATIC-ELECTRICITY APPLYING PROCESS)

The same raw pellets as those used in Example 1 were melt-extruded by the same apparatus as that in Example 1 at a melt temperature of 310° C. and a delivery rate of 3.0 kg/hour. The surface temperature of a casting roll was 185° C. At this time, a tungsten-made wire (pinning wire) of 0.15 mm across was stretched in parallel with the axis of the roll at a position separated by 5 mm in the radial direction of the roll from the point of the roll, at which the molten resin extruded contacted. About 5.0 kV of direct current voltage was applied between the wire and the roll to cast the sheet under application of static electricity.

The thus-obtained sheet had a thickness of 160 μm and the take up rate was about 1.0 m/min. The degree of crystallization of the sheet was 27.5%. The surface roughness, Ra of the sheet were 0.020 μm and 0.100 μm on the side brought into contact with the casting roll and on the pinning wire side, respectively.

Further, the sheet was subjected to a heat treatment for 10 minutes at 260° C. by heated air in a Geer oven. The sheet thus heat-treated had a degree of crystallization of 33.1% and surface roughness, Ra of 0.030 μm and 0.090 μm on the casting roll side and on the pinning wire side, respectively.

Measurement results of physical properties and others are collectively given in Table 2.

Comparative Example 3

EXAMPLE 5

Using the same raw pellets as those employed in Example 4, a sheet of 160 μm thick was obtained under the same conditions as in Example 4 except for the omission of the static-electricity application to the pinning wire.

The sheet thus obtained had a degree of crystallization of 28.4% and surface roughness, Ra of 0.060 μm and 0.150 μm on the side brought into contact with the casting roll and on the opposite side thereto, respectively.

Further, the sheet was subjected to a heat treatment for 10 minutes at 260° C. by heated air in a Geer oven. The sheet thus heat-treated had a degree of crystallization of 35.0% and surface roughness, Ra of 0.060 μm and 0.160 μm on the side brought into contact with the casting roll and on the opposite side thereto, respectively.

Measurement results of physical properties and others are collectively given in Table 2.

COMPARATIVE EXAMPLE 3

Substantially linear poly(p-phenylene sulfide) having a melt viscosity of 870 poises and a melt crystallization temperature, Tc$_2$ of 253° C. was melt-extruded into pellets.

A sheet was produced from the thus-obtained pellets by means of the same apparatus as that employed in Example 1 using a static-electricity applying device under the same conditions as in Example 4. The surface temperature of the casting roll was 170° C. The crystallized sheet thus obtained had a thickness of 260 μm.

The sheet had a degree of crystallization of 34 0%. Besides, the surface roughness, Ra of the sheet were 0.010 μm and 0.007 μm on the side brought into contact with the surface of the casting roll and on the pinning wire side, respectively.

Further, the sheet was subjected to a heat treatment for 10 minutes at 260° C. by heated air in a Geer oven to facilitate its crystallization. The sheet thus heat-treated had a degree of crystallization of 38.6%. Besides, its surface roughness, Ra were 0.009 μm and 0.010 μm on the side brought into contact with the casting roll and on the pinning wire side, respectively. Its degree of crystallization increased to 33.1%.

With respect to flex resistance, its number of flexings to break was measured. It was found to be twice for the sheet before the heat treatment and once for the sheet after the heat treatment. Therefore, the sheet was inferior in flex resistance and was brittle, and can hence not be subjected to bend processing or the like.

Measurement results of physical properties and others are collectively given in Table 2.

EXAMPLE 6

Substantially linear poly(p-phenylene sulfide) having a melt viscosity of 9,400 poises (as measured at 310° C. and a shear rate of 200 sec$^{-1}$) and a melt crystallization temperature, Tc$_2$ of 179° C. was melt-extruded into pellets.

The pellets thus obtained were melt-extruded by the same apparatus as in Example 4 at a melt temperature of 310° C. and a delivery rate of 2.1 kg/hour. The surface temperature of a casting roll was 150° C. At this time, about 5.0 kV of direct current voltage was applied between a pinning wire and the roll to cast the sheet under application of static electricity. The take-up rate was about 0.57 m/min. The thus-obtained sheet had a thickness of about 200 μm.

Its number of flexings to break was measured. It was found to be 370 times. The sheet was subjected to a heat treatment for 10 minutes at 260° C. in a Geer oven. The number of flexings to break of the sheet thus heat-treated was 140 times.

EXAMPLE 7

A sheet was obtained in the same manner as in Example 6 except that the surface temperature of the casting roll was changed from 150° C. to 175° C.

The number of flexings to break of the thus-obtained sheet was measured. It was found to be 140 times. The sheet was subjected to a heat treatment for 10 minutes at 260° C. in a Geer oven. The number of flexings to break of the sheet thus heat-treated was 105 times.

Measurement results of physical properties and others are collectively given in Table 2.

Incidentally, results in Example 15, which will be described subsequently, are also shown collectively in Table 2.

TABLE 2

| | Ex. 1 | Comp. Ex. 1 | Comp. Ex. 2 | Ex. 2 | Ex. 3 | Ex. 4 | Ex. 5 | Comp. Ex. 3 | Ex. 6 | Ex. 7 | Ex. 15 |
|---|---|---|---|---|---|---|---|---|---|---|---|
| PPS | | | | | | | | | | | |
| Melt viscosity, η* (poises) | 7,300 | 7,300 | 7,300 | 6,800 | 7,300 | 7,300 | 7,300 | 870 | 9,400 | 9,400 | 3,100 |
| Melt crystallization temperature, Tc$_2$ (°C.) | 172 | 172 | 172 | 204 | 204 | 172 | 172 | 253 | 179 | 179 | 205 |
| Nucleating agent (carbon black) (phr) | — | — | — | 1 | — | — | — | — | — | — | — |
| Processing conditions | | | | | | | | | | | |
| Melt temperature (°C.) | 310 | 310 | 310 | 310 | 310 | 310 | 310 | 310 | 310 | 310 | 310 |
| Delivery rate (kg/hour) | 3.0 | 3.0 | 3.0 | 3.0 | 3.0 | 3.0 | 3.0 | 3.2 | 2.1 | 2.1 | 3.0 |
| Surface temperature of casting roll (°C.) | 155 | 80 | 105 | 160 | 160 | 155 | 155 | 170 | 150 | 175 | 150 |
| Applied static electricity (kV) | — | — | — | — | — | 5.0 | — | 5.0 | 5.0 | 5.0 | 5.0 |
| Take-up rate (m/min) | 0.85 | 0.87 | 0.87 | 1.0 | 1.0 | 1.0 | 1.0 | 0.66 | 0.57 | 0.57 | 1.35 |
| Physical properties of sheet | | | | | | | | | | | |
| Separation property from casting roll | Good | Good | Inferior | Good | Good | Good | Good | Good | Good | Good | Good |
| Thickness of sheet (μm) | 190 | 190 | 190 | 160 | 160 | 160 | 160 | 260 | 200 | 200 | 120 |
| Density (g/cm$^3$) | 1.341 | — | — | — | — | — | — | — | — | — | 1.341 |
| Degree of crystallization (%) | 25.9 | 0 | <10 | 27.0 | 26.1 | 27.5 | 28.4 | 34.0 | — | — | 27.6 |
| Surface roughness, Ra (μm) | | | | | | | | | | | |
| Casting roll side | 0.050 | 0.010 | — | 0.010 | 0.045 | 0.020 | 0.060 | 0.010 | — | — | 0.045 |
| Opposite side | 0.130 | 0.010 | — | 0.040 | 0.110 | 0.100 | 0.150 | 0.007 | — | — | 0.110 |

| | Ex. 1 | Comp. Ex. 1 | Comp. Ex. 2 | Ex. 2 | Ex. 3 | Ex. 4 | Ex. 5 | Comp. Ex. 3 | Ex. 6 | Ex. 7 | Ex. 15 |
|---|---|---|---|---|---|---|---|---|---|---|---|
| Physical properties of heat-treated sheet | | | | | | | | | | | |
| Heat treatment (260° C./10 min) | Conducted | Not conducted | Not conducted | Conducted | Not conducted | Conducted | Not conducted | Conducted | Conducted | Conducted | Conducted |
| Degree of crystallization (%) | 33.1 | — | — | 35.9 | — | 33.1 | 35 | 38.6 | — | — | 30 |
| Surface roughness, Ra (μm) | | | | | | | | | | | |
| Casting roll side | 0.060 | — | — | 0.010 | — | 0.030 | 0.060 | 0.009 | — | — | 0.055 |
| Opposite side | 0.140 | — | — | 0.040 | — | 0.090 | 0.160 | 0.010 | — | — | 0.130 |
| Yield strength (kg/mm$^2$) | 9 | — | — | 9 | — | 9 | — | 10 | — | — | 9 |
| Breaking strength (kg/mm$^2$) | 6 | — | — | 6 | — | 6 | — | 6 | — | — | 7 |

TABLE 2-continued

| | | | | | | | | | | |
|---|---|---|---|---|---|---|---|---|---|---|
| Elongation at break (%) | 40 | — | — | 32 | — | 40 | — | 10 | — | — | 30 |
| Tensile modulus (kg/mm$^2$) | 330 | — | — | 350 | — | 330 | — | 370 | — | — | 320 |
| Degree of orientation | 0.96 | — | — | 0.95 | — | 0.95 | — | 0.97 | — | — | 0.97 |
| Number of flexings to break | | | | | | | | | | | |
| Before heat treatment | 320 | 440 | — | 230 | 250 | 260 | — | 2 | 370 | 140 | 370 |
| After heat treatment (260° C./10 min) | 110 | — | — | 160 | — | 100 | — | 1 | 140 | 105 | 180 |
| Coefficient of dynamic friction | | | | | | | | | | | |
| Before heat treatment | 0.3 | — | — | 0.4 | — | 0.3 | — | 0.3 | — | — | 0.3 |
| After heat treatment (260° C./10 min) | 0.3 | — | — | 0.4 | — | 0.3 | — | 0.3 | — | — | 0.3 |
| Y value found from log Y = 7.11 − 2.34 log t (times) | 60 | 60 | 60 | 90 | 90 | 90 | 90 | 29 | 53 | 53 | 176 |

EXAMPLES 8–13

Pellets were produced from high-viscosity poly(p-phenylene sulfide), which had been obtained by polymerizing a system composed of 100 parts by weight of dichlorobenzene and 0.2 part by weight of trichlorobenzene and had a melt viscosity of 14,000 poises (as measured at 310° C. and a shear rate of 200 sec$^{-1}$) and a melt crystallization temperature, Tc$_2$ of 198° C. Portions of the pellets thus obtained were separately melt-extruded by means of the same apparatus as that employed in Example 1 and each of the extrudates was crystallized on a casting roll, thereby producing sheets. At this time, temperatures of each melt to be extruded and a die portion were controlled to 315° C. and 320° C. respectively.

The delivery rate was 2.1 kg/hour. Applied voltage of a static-electricity applying device was 4.0 kV and the surface temperature of the casting roll was 155° C. Take-up rates of sheets to be formed were respectively changed to produce sheets having their corresponding thicknesses as shown in Table 3. All of the thus-obtained sheets were good in separating from the casting roll and excellent in appearance.

However, casting was conducted by reducing the delivery rate to about 1.0 kg/hour and controlling the take-up rate in Example 12. Besides, the delivery rate was reduced to about 0.5 kg/hour to take up the sheet in Example 13. Other conditions were the same as those in Example 8.

TABLE 3

| Ex. | Take-up rate (m/min) | Thickness of sheet (μm) | Degree of crystallization (%) |
|---|---|---|---|
| 8 | 0.28 | 400 | 26.5 |
| 9 | 0.57 | 200 | 27.5 |
| 10 | 1.13 | 100 | 28.4 |
| 11 | 1.89 | 60 | 28.4 |
| 12 | 2.69 | 20 | 29.3 |
| 13 | 3.37 | 8 | 29.3 |

The sheet obtained in Example 9 had surface roughness, Ra of 0.010 μm and 0.025 μm on the side brought into contact with the casting roll and on the pinning wire side, respectively. The sheet had a yield strength of 8 kg/mm$^2$, a breaking strength of 6 kg/mm$^2$, an elongation at break of 44% and a tensile modulus of 300 kg/mm$^2$.

Further, the sheet was subjected to a heat treatment for 10 minutes at 260° C. by heated air in a Geer oven to facilitate its crystallization. The sheet thus heat-treated had a degree of crystallization of 33.1% and surface roughness, Ra of 0.024 μm and 0.035 μm on the casting roll side and on the pinning wire side, respectively. The sheet had a yield strength of 9 kg/mm$^2$, a breaking strength of 6 kg/mm$^2$, an elongation at break of 31% and a tensile modulus of 310 kg/mm$^2$. Furthermore, the sheet of Example 13 was subjected to a heat treatment for 10 minutes at 260° C. by heated air in a Geer oven to facilitate its crystallization. At this time, the sheet was free in both machine and transverse directions. The sheet after the heat treatment shrunk by 2.5% in length and 0% in width, respectively, based on the length and width of the sheet before the heat treatment. The heat-treated sheet had a degree of crystallization of 33.1%. The thus-obtained sheet, which had been subjected to the heat treatment for 10 minutes at 260° C. to facilitate its crystallization, was subjected further to a heat treatment for 10 minutes at 255° C. in a manner that the sheet was free in both machine and transverse directions. Percent changes in dimensions of the heat-treated sheet were 0% in both machine and transverse directions. On the other hand, an amorphous sheet was produced by a method known per se in the art using the same resin as that in Example 13. The sheet was stretched 3.5 times in the machine direction and 3.5 times in the transverse direction by sequential biaxial stretching. The thus-obtained film was subjected to a heat treatment for 10 minutes at 260° C. while maintaining its length constant. The film had a thickness of 15 μm. The biaxially-stretched film was subjected further to a heat treatment for 10 minutes at 255° C. in a manner that the sheet was free in both machine and transverse directions. Percent shrinkages of the heat-treated film were 4% and 6% in its machine and transverse directions, respectively.

As described above, the crystallized sheet obtained in Example 13 was small in percent heat shrinkage and hence excellent in dimensional stability to heat. The degree of crystalline orientation of the resulting sheet was 0.47 as determined by striking X-rays on the sheet in a direction perpendicular to an edge face thereof. The sheet was hence found to be oriented to a great extent. The numbers of flexings to break of the crystallized sheet obtained in Example 13 were 200,000 times and 100,000 times before and after the heat treatment, respectively, indicating that the sheet had high reflex resistance.

The data of the characteristics and properties of the sheets obtained in these Examples, processing conditions and others are shown collectively in Table 4.

TABLE 4

| | Ex. 8 | Ex. 9 | Ex. 10 | Ex. 11 | Ex. 12 | Ex. 13 |
|---|---|---|---|---|---|---|
| PPS | | | | | | |
| Melt viscosity, η* (poises) | 14,000 | 14,000 | 14,000 | 14,000 | 14,000 | 14,000 |
| Melt crystallization temperature, Tc$_2$ (°C.) | 198 | 198 | 198 | 198 | 198 | 198 |

TABLE 4-continued

|  | Ex. 8 | Ex. 9 | Ex. 10 | Ex. 11 | Ex. 12 | Ex. 13 |
| --- | --- | --- | --- | --- | --- | --- |
| Nucleating agent (carbon black) (phr) | — | — | — | — | — | — |
| Processing conditions |  |  |  |  |  |  |
| Melt temperature (°C.) | 315 | 315 | 315 | 315 | 315 | 315 |
| Delivery rate (kg/hour) | 2.1 | 2.1 | 2.1 | 2.1 | 1.0 | 0.5 |
| Surface temperature of casting roll (°C.) | 155 | 155 | 155 | 155 | 155 | 155 |
| Applied static electricity (kV) | 4.0 | 4.0 | 4.0 | 4.0 | 4.0 | 4.0 |
| Take-up rate (m/min) | 0.28 | 0.57 | 1.13 | 1.89 | 2.69 | 3.37 |
| Physical properties of sheet |  |  |  |  |  |  |
| Separation property from casting roll | Good | Good | Good | Good | Good | Good |
| Thickness of sheet (μm) | 400 | 200 | 100 | 60 | 20 | 8 |
| Density (g/cm$^3$) | — | — | — | — | — | — |
| Degree of crystallization (%) | 26.5 | 27.5 | 28.4 | 28.4 | 29.3 | 29.3 |
| Surface roughness, Ra (μm) |  |  |  |  |  |  |
| Casting roll side | 0.012 | 0.010 | 0.010 | 0.009 | 0.008 | 0.008 |
| Opposite side | 0.030 | 0.025 | 0.020 | 0.013 | 0.010 | 0.010 |
| Physical properties of heat-treated sheet |  |  |  |  |  |  |
| Heat treatment (260° C./10 min) | Conducted | Conducted | Conducted | Conducted | Conducted | Conducted |
| Degree of crystallization (%) | 32.1 | 33.1 | 33.1 | 34.0 | 34.0 | 33.1 |
| Surface roughness Ra (μm) |  |  |  |  |  |  |
| Casting roll side | 0.020 | 0.024 | 0.020 | 0.015 | 0.012 | 0.010 |
| Opposite side | 0.035 | 0.035 | 0.030 | 0.020 | 0.015 | 0.013 |
| Yield strength (kg/mm$^2$) | 9 | 9 | 9 | 8 | 8 | 8 |
| Breaking strength (kg/mm$^2$) | 6 | 6 | 7 | 7 | 15 | 20 |
| Elongation at break (%) | 30 | 31 | 50 | 60 | 120 | 150 |
| Tensile modulus (kg/mm$^2$) | 300 | 310 | 310 | 320 | 330 | 340 |
| Degree of orientation | 0.96 | 0.93 | 0.87 | 0.79 | 0.61 | 0.47 |
| Number of flexings to break |  |  |  |  |  |  |
| Before heat treatment | 50 | 160 | 1,100 | 8,000 | 80,000 | 200,000 |
| After heat treatment (260° C./10 min) | 35 | 80 | 800 | 7,000 | 35,000 | 100,000 |
| Coefficient of dynamic friction |  |  |  |  |  |  |
| Before heat treatment | 0.3 | 0.3 | 0.3 | 0.4 | 0.4 | 0.4 |
| After heat treatment (260° C./10 min) | 0.3 | 0.3 | 0.3 | 0.4 | 0.4 | 0.4 |
| Y value found from log Y = 7.11−2.34 log t (times) | 11 | 53 | 269 | 890 | 11,630 | 99,260 |

EXAMPLE 14

Substantially linear poly(p-phenylene sulfide) having a melt viscosity of 9,400 poises and a melt crystallization temperature, $Tc_2$ of 179° C. was melt-extruded into pellets.

The pellets thus obtained were extruded into a sheet-like form through a T-die which was fitted to an extruder having a barrel diameter of 35 mm and defined a lip having a width of 250 mm. The melt temperature of the resin was 310° C., and the delivery rate was 2.1 kg/hour. The surface temperature of the casting roll was 132° C. At this time, a tungsten-made wire (pinning wire) of 0.15 mm across was stretched in parallel with the axis of the roll at a position separated by 5 mm in the radial direction of the roll from the point of the roll, at which the molten resin extruded contacted. About 4.5 kV of direct current voltage was applied between the wire and the roll to cast the sheet under application of static electricity. The take-up rate of the sheet was about 0.58 m/min.

The thus-obtained sheet had a thickness of 200 μm and the degree of crystallization of the sheet was 6%. The surface roughness, Ra of the sheet were 0.018 μm and 0.110 μm on the side brought into contact with the casting roll and on the pinning wire side, respectively. The sheet will be designated as "Sheet A".

With respect to the flex resistance of the Sheet A, its number of flexings to break was measured. It was found to be 380 times.

Further, the Sheet A was subjected to a heat treatment on a ceramic roll controlled at 240° C. The residence time of the sheet on the ceramic roll was about 1 minute. The sheet thus heat-treated had a degree of crystallization of 24%. In addition, its number of flexings to break was 140 times. The heat-treated sheet will be designated as "Sheet B".

On the other hand, an amorphous sheet of 200 μm thick was produced by changing the temperature of the casting roll to 50° C. and using the same extruding conditions, pinning conditions and take-up rate as in Example 14. The degree of crystallization of the thus-produced sheet was zero. Its number of flexings to break was 420 times. The amorphous sheet will be designated as "Sheet C".

With a view toward observing the high-temperature resistance of the Sheets A, B and C, the sheets were separately heated by a "Thermo Mechanical Analyzer (TMA) 40" manufactured by Mettler Instrument AG at a heating rate of 2° C./min under a slight load of 1.7 g/mm$^2$. The elongation or shrinkage behavior of the sheets where they were heated in this manner is illustrated in FIG. 1. In FIG. 1, lines (1), (2) and (3) show the elongation or shrinkage behavior of Sheets A, B and C, respectively.

It is understood from FIG. 1 that the amorphous sheet C undergoes a great deformation when the sheet reaches a temperature level beyond the glass transition point (about 90° C.) of the sheet, thereby leading to its break due to the elongation thereof [line (3)].

On the other hand, although Sheet A having a degree of crystallization of 6% exhibits some elongation due to the expansion of its amorphous portions and the like in a temperature range beyond the glass transition points of the sheet, a great deformation leading to its break does not take place in a high-temperature range up to at least 250° C. [line (1)].

Further, Sheet B having a degree of crystallization of 24% exhibits the behavior as depicted by the line (2) on FIG. 1. The behavior exhibited is substantially the same elongation behavior as that of the Sheet A. Since the Sheet B is high in degree of crystallization compared to the Sheet A, the deformation as to elongation in the temperature range beyond the glass transition point is less than that of the Sheet A.

COMPARATIVE EXAMPLE A

A heat treatment apparatus constructed of a ceramic roll having a surface roughness, Ra of 0.063 μm and a diameter of 150 mm, a rubber-made pinch roll, etc. was provided. At this time, the gauge pressure and the pinch pressure of the linear pressure were respectively 3.0 kg/cm² and 1.2 kg/cm. Moreover, the temperature of the ceramic roll was controlled at 155° C. On the other hand, the surface temperature of the rubber roll was about 100° C.

After the amorphous sheet obtained in Comparative Example 1 and having a thickness of 190 μm was fed along and in contact with the surface of the pinch roll to preheat it for 10 seconds, the sheet was introduced into the pinching point. After passing through the pinch point, the sheet was transferred onto the ceramic roll on which the sheet was subjected to a heat treatment and was hence crystallized. The residence time of the sheet on the ceramic roll was about 30 seconds. On the other hand, the peripheral speed of the surface of the ceramic roll was about 0.3 m/min.

Under those conditions, a crystallized sheet was produced by linearly-pressurizing the amorphous sheet with the pinch roll and then crystallizing it. The thus-obtained sheet was wound up on a take-up roll.

The sheet thus obtained had surface roughness, Ra of 0.150 μm and 0.170 μm on the ceramic roll side and on the pinch roll side, respectively. The sheet had a degree of crystallization of 20%, a breaking strength of 5.2 kg/mm², an elongation at break of 80% and a Young's modulus of 350 kg/mm². Its number of flexings to break was 130 times. Moreover, the coefficient of dynamic friction of the crystallized sheet as to the pinch roll side was 0.3 as measured against another sheet of the same kind as the crystallized sheet.

EXAMPLE 15

Substantially linear poly(p-phenylene sulfide) having a melt viscosity of 3,100 poises and a melt crystallization temperature, $Tc_2$ of 205° C. was melt-extruded into pellets.

The pellets thus obtained were extruded into a sheet-like form through a T-die which was fitted to an extruder having a barrel diameter of 35 mm and an L/D ratio of 28 and defined a lip having a clearance of 0.55 mm and a width of 250 mm. The melt temperature of the resin was 310° C. and the delivery rate was 3.0 kg/hour. The distance between the tip of the T-die and the upper portion of a casting roll was adjusted to about 10 mm. The surface temperature of the casting roll was controlled at 150° C. The casting roll had a diameter of 300 mm.

The take-up rate was controlled so that the sheet thus wound had a thickness of 120 μm. The take-up rate was 1.35 m/min.

The thus-obtained sheet had a density of 1.343 g/cm³ at 23° C. The degree of crystallization found from this value was 27.6%. The surface roughness, Ra of the sheet were 0.045 μm and 0.110 μm on the side brought into contact with the casting roll and on the opposite side thereto, respectively. The sheet had a coefficient of dynamic friction of 0.3 on the side brought into contact with the casting roll with respect to flex resistance, its number of flexings to break was measured. It was found to be 370 times.

Further, the sheet was subjected to a heat treatment for 10 minutes at 260° C. by heated air in a Geer oven to facilitate its crystallization. The sheet thus heat-treated had surface roughness, Ra of 0.055 μm and 0.130 μm on the side kept into contact with the casting roll and on the opposite side thereto, respectively. Its degree of crystallization increased to 30%. Its degree of orientation was 0.97. Moreover, the heat-treated sheet had a coefficient of dynamic friction of 0.3 on the side brought into contact with the casting roll.

With respect to flex resistance, its number of flexings to break was measured. It was found to be 180 times.

Furthermore, the heat-treated sheet had a yield strength of 9 kg/mm², breaking strength of 7 kg/mm², elongation at break of 30% and tensile modulus of 320 kg/mm².

EXAMPLE 16: (USE OF VENTED EXTRUDER)

As a PAS, was used powder of substantially linear poly(p-phenylene sulfide) having a melt viscosity, $\eta^*$ of 9,400 poises and a melt crystallization temperature, $Tc_2$ of 179° C. Moreover, as a vented extruder, was used a twin-screw extruder "BT-30" manufactured by Plastic Kogaku K.K. [wherein the surface of the cylinder part was coated with "H-503" (Ni-Co-Cr-Si-B alloy; product of Hitachi Metals, Ltd.), and the screws were subjected to hard chrome plating]. A vacuum pump having a cold trap was attached to a vent port of the extruder.

The powder of the poly(p-phenylene sulfide) was melt-extruded by the twin-screw extruder at the melt temperature of the polymer, i.e., 320° C. into strings. The strings were cooled with water into pellets. The twin-screw extruder was made vacuous by drawing a vacuum with the vacuum pump attached to a vent zone through the vent port to remove solvent-extracted low-molecular weight materials from the polymer. The delivery rate of the melt was about 10 kg/hour. The degree of vacuum by the vacuum-drawing was read from a pressure gauge attached near to the vent zone. It read about −72 cmHg (about 40 mmHg).

The pellets thus obtained were melt-extruded into a sheet-like form through a T-die which was fitted to a single screw extruder having a barrel diameter of 35 mm and an L/D ratio of 28 and defined a lip having a width of 25 cm and a lip clearance of 0.5 mm. The melt temperature of the polymer was 310° C. and the delivery rate was 2.5 kg/hour. The distance between the tip of the T-die and a casting roll was adjusted to about 10 mm. The surface temperature of the casting roll was controlled at 130° C. The casting roll had a diameter of 300 mm.

The take up rate was controlled to 0.68 m/min so that the sheet thus wound had a thickness of 200 μm. Incidentally, a tungsten-made wire (pinning wire) of 0.15 mm across was stretched in parallel with the axis of the casting roll, and static casting was conducted while applying about 5 kV of direct current voltage between the wire and the roll.

The thus-obtained sheet had a density of 1.325 g/cm³ at 23° C. The degree of crystallization found from this value was 12%. The surface roughness, Ra of the sheet were 0.022 μm and 0.049 μm on the side brought into contact with the casting roll and on the opposite side thereto, respectively. The sheet had a coefficient of dynamic friction of 0.3 on the side brought into contact with the casting roll. With respect to flex resistance, its number of flexings to break was measured. It was found to be 370 times.

Further, the sheet was subjected to a heat treatment for 10 minutes at 260° C. by heated air in a Geer oven to facilitate its crystallization. The heat-treated sheet had a degree of crystallization of 28% and a degree of orientation of 0.96. Its surface roughness, Ra were 0.030 μm and a 0.055 μm on the side kept into contact with the casting roll and on the opposite side thereto, respectively. Moreover, the heat-treated sheet had a coefficient of dynamic friction of 0.3 on the side brought into contact with the casting roll. Its number of flexings to break was 120 times. The heat-treated sheet had a yield strength of g kg/mm$^2$, breaking strength of 7 kg/mm$^2$, elongation at break of 40% and tensile modulus of 330 kg/mm$^2$.

The amount of materials extracted with xylene from this sheet was 0.27 wt. % of the sheet sample. By the way, this value is an average value of measurements obtained by conducting the above-described xylene-extraction process three times as to sheet samples from the same sheet.

According to the process like this, it is possible to obtain a sheet having an extremely-low oligomer content.

EXAMPLE 17: (USE OF VENTED EXTRUDER)

Using the same vented twin-screw extruder as that employed in Example 16, pellets were produced from powder of substantially linear poly(p-phenylene sulfide) having a melt viscosity, η* of 5,900 poises and a melt crystallization temperature, Tc$_2$ of 200° C. The pelletization conditions as to extrusion temperature and delivery rate were also substantially the same. The degree of vacuum by the vacuum-drawing was about −70 cmHg (about 60 mmHg) from the indication of a pressure gauge.

The pellets thus obtained were melt-extruded into a sheet-like form under the same conditions as in Example 16. The sheet was then crystallized on a casting roll to obtain a sheet of 200 μm thick.

The amount of materials extracted with xylene from the sheet, which was determined in the same manner as in Example 16, was 0.43 wt. %.

The thus-obtained sheet had a density of 1.320 g/cm$^3$ at 23° C. The degree of crystallization found from this value was 7%. The surface roughness, Ra of the sheet were 0.018 μm and 0.045 μm on the side brought into contact with the casting roll and on the opposite side thereto, respectively. The sheet had a coefficient of dynamic friction of 0.3 on the side brought into contact with the casting roll. With respect to flex resistance, its number of flexings to break was measured. It was found to be 350 times.

Further, the sheet was subjected to a heat treatment for 10 minutes at 260° C. by heated air in a Geer oven to facilitate its crystallization. The heat-treated sheet had a degree of crystallization of 27% and a degree of orientation of 0.98. Its surface roughness, Ra were 0.026 μm and 0.052 μm on the side kept into contact with the casting roll and on the opposite side thereto, respectively. Moreover, the heat-treated sheet had a coefficient of dynamic friction of 0.3 on the side brought into contact with the casting roll. Its number of flexings to break was 105 times. The heat-treated sheet had a yield strength of 9 kg/mm$^2$, breaking strength of 7 kg/mm$^2$, elongation at break of 30% and tensile modulus of 350 kg/mm$^2$.

EXAMPLE 18: (SHEET FOR INSULATING MOTOR OF COOLANT-COMPRESSOR

Bend-processing

A sample of 85×25 mm in size was cut out of the crystallized sheet (heat-treated sheet; degree of crystallization: 28%) obtained in Example 16. The sample was heated to 125° C. and bend for processing in a U-shaped form (at 180°). This bend-processing was conducted 5 times. No cracks occurred on the outside of the bent part in all the processings. On the contrary, when the bend-processing was performed at room temperature, cracks were recognized in the proportion of 3 times to 5 times.

When the sheet-like formed product obtained by the bend-processing was used as an sheet-like formed product for insulating a motor of a coolant-compressor, the compressor was able to use for a long period of time without trouble though the motor was a heat build-up type.

EXAMPLE 19: (BEND-PROCESSING OF LOW-DEGREE OF CRYSTALLIZATION SHEET AT ROOM TEMPERATURE)

The sheet produced in Example 17 and having a degree of crystallization of 7% and a length of 10 cm was slit into a strip of 85 mm wide. The strip was caused to pass between a pair of rotating metal rolls, which were controlled at room temperature (23° C.), while bending it at positions advanced inside by 3 mm from both ends into a U-shape, whereby the strip was bent and its shape was fixed.

The clearance between the pair of the metal rolls was about 0.5 mm. It was finely adjusted manually so that sufficient bending and fixing were conducted. The sheet thus obtained was bended and fixed to a sufficient extent. Moreover, no whitening and break were recognized at the bent parts. The sheet hence had sufficient practical utility.

EXAMPLES 20-21

Using the same resin as that employed in Example 8, which had a melt viscosity of 14,000 poises, casting was conducted by extruding the resin at a delivery rate of 2.0 kg/hour under the same extruding conditions as in Example 8 and controlling the take-up rate. The take-up rate was 1.62 m/min and the thickness of the resulting sheet was 50 μm. The sheet had a degree of crystallization of 23% and a degree of orientation of 0.75 (Example 20).

On the other hand, using the same resin as that employed in Example 1, which had a melt viscosity of 7,300 poises, a sheet of 50 μm thick was produced at a delivery rate of 2.0 kg/hour and a take-up rate of 2.16 m/min under the same conditions as described above. The thus-obtained sheet had a degree of crystallization of 22% and a degree of orientation of 0.97, which indicated substantially no orientation (Example 21).

The drawdown ratios (draft ratios) of these sheet are both 11 because the clearance of the extruder die lip is 0.55 mm.

On the other hand, in order to determine the winding tensions of the sheets in the case when the draft ratio was 11 at a melt temperature of 310° C., each of their resins was extruded at a melt temperature of 310° C. by a Capillograph through a nozzle of 1.0 mm in diameter and 10 mm in length. At this time, the winding tension of a strand extruded was measured at a draft ratio of 11.

In the case of the resin employed in Example 20, the winding tension under the above conditions was 8 g and there was hence a tension of 10 g/mm² to the sectional area of the nozzle. In the case of the resin used in Example 21 on the other hand, the winding tension was 1 g and there was hence a tension of 1.3 g/mm² to the sectional area of the nozzle.

With respect to these sheets, the percent heat shrinkages in both machine and transverse directions were 1.0/0 (MD/TD) in the sheet of Example 20 and 0.5/0 (MD/TD) in the sheet of Example 21. They were hence good in each sheet.

The determination of the winding tension to what extent also depends on the properties of a resin to be used and processing conditions. A sheet obtained under conditions of a high winding tension is great in degree of crystalline orientation from its edge face. This makes its elongation at break high in the machine direction (MD). In this invention, the preferred winding tension is at least 2.5 g/mm².

What is claimed is:

1. In a poly(arylene sulfide) sheet excellent in planarity and smoothness, said sheet being formed of a poly(arylene sulfide) having a melt viscosity, $\eta^*$ of 1,000-25,000 poises as measured at 310° C. and a shear rate of 200 sec$^{-1}$, and a melt crystallization temperature, $Tc_2$ of 170°-240° C. wherein $Tc_2$ is an exothermic peak temperature of crystallization which appears upon the measurement by a differential scanning calorimeter at a cooling rate of 10° C./min after the polymer is heated from 23° C. to 380° C. at a rate of 10° C./min and then held for 3 minutes at 380° C., the improvement wherein:

(a) the surface roughness, Ra of at least one side of the sheet is 0.09 μm or less;
   (b) the degree of crystallization of the sheet is at least 5%; and
   (c) the number of flexings to break, Y of the sheet satisfies the following equation (I):

$$\log Y \geq 7.11 - 2.34 \log t \qquad (I)$$

wherein t means a thickness (μm) of the sheet.

2. The poly(arylene sulfide) sheet as claimed in claim 1, wherein the sheet contains materials extracted by extraction with xylene in an amount of 0.5 wt. % or less of the whole weight before extraction.

3. A sheet for insulating the motor of a coolant-compressor, which comprises the poly(arylene sulfide) sheet as claimed in claim 2.

4. The poly(arylene sulfide) sheet as claimed in claim 1, which has a melt viscosity, $\eta^*$ of at least 8,000 poises as measured at 310° C. and a shear rate of 200 sec$^{-1}$ and has been uniaxially oriented.

* * * * *